Figure 1:
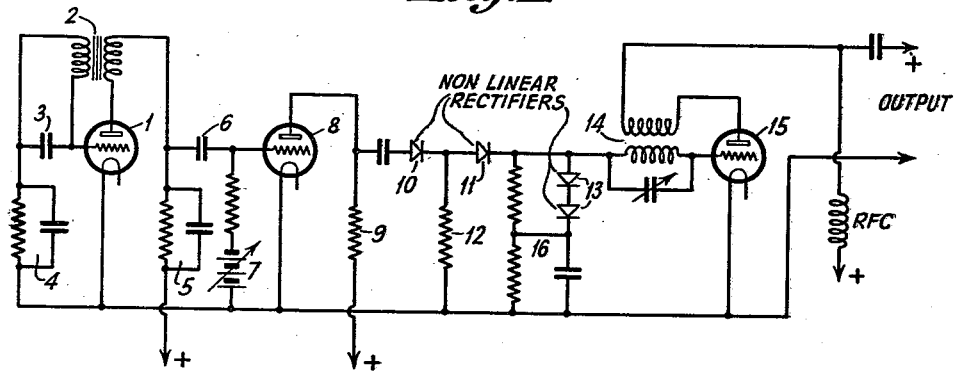

Nov. 28, 1939.  P. KOTOWSKI ET AL  2,181,568
IMPULSE OR PULSE TRANSMITTER
Filed Jan. 13, 1937  3 Sheets-Sheet 1

INVENTORS
PAUL KOTOWSKI AND
S. SONNENFELD
BY
ATTORNEY

Nov. 28, 1939. P. KOTOWSKI ET AL 2,181,568
IMPULSE OR PULSE TRANSMITTER
Filed Jan. 13, 1937 3 Sheets-Sheet 2
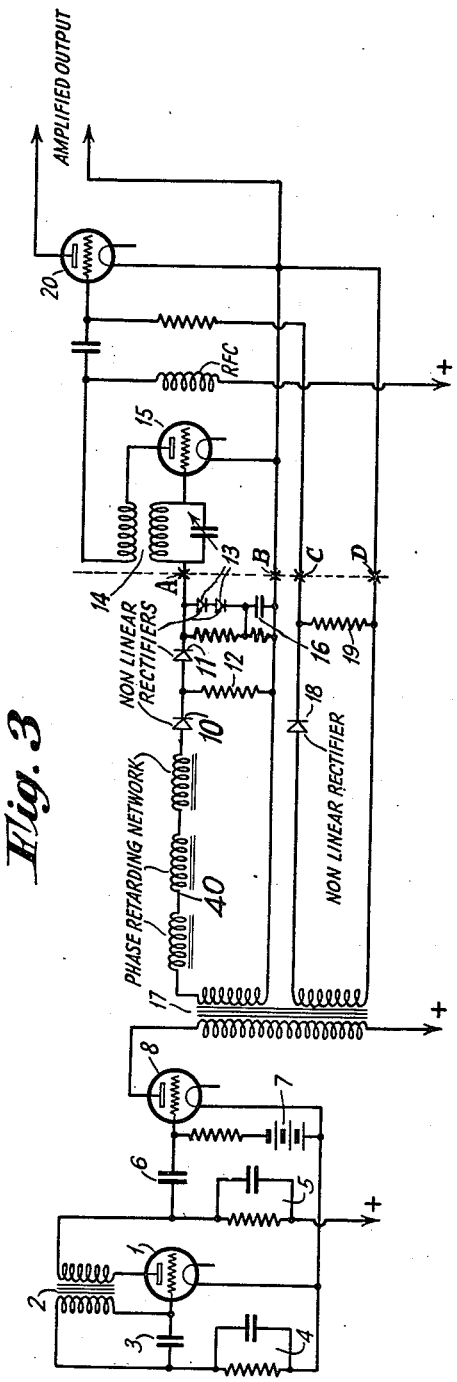
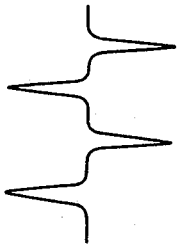
INVENTORS
PAUL KOTOWSKI AND
S. SONNENFELD
BY
ATTORNEY Nov. 28, 1939.  P. KOTOWSKI ET AL  2,181,568
IMPULSE OR PULSE TRANSMITTER
Filed Jan. 13, 1937  3 Sheets-Sheet 3

INVENTORS
PAUL KOTOWSKI AND
S. SONNENFELD
BY
ATTORNEY

Patented Nov. 28, 1939

2,181,568

UNITED STATES PATENT OFFICE

2,181,568

IMPULSE OR PULSE TRANSMITTER

Paul Kotowski, and Siegmund Sonnenfeld, Berlin, Germany, assignors to Telefunken Gesellschaft für Drahtlose Telegraphie m. b. H., Berlin, Germany, a corporation of Germany Application January 13, 1937, Serial No. 120,328
In Germany February 4, 1936

8 Claims. (Cl. 250—36)

In known directive systems comprising directive receivers and impulse transmitters used to find the position of vessels impulse transmitters are used which for brief periods of time, say, around $10^{-3}$ seconds, send out high frequency wave trains at a low frequency rhythm, say, of 300 cycles per second. It has also been suggested in the earlier art to generate these impulses by feeding the transmitter or the end (power) tube thereof with plate potential at the rhythm of the impulses, during the impulsing periods, while during the intermediate periods the plate potential is cut off. This method, while very reliable in practical operation, involves the drawback that the keying mechanism which as a general rule consists of tubes, must be designed for the aggregate transmitter power. Another method is predicated upon the fact that the oscillator tube of the transmitter is allowed to "trickle", in other words, the oscillator tube while oscillating, causes a condenser connected in its grid circuit to be charged by its grid current to a point where the condenser voltage is so high that the conditions for self-excitation are no longer satisfied, with the result that the oscillations are discontinued. The condenser becomes then discharged by way of a parallel resistance until the oscillations are resumed again in the presence of a definite low condenser potential. This method has the shortcoming that the keying rhythm and the shape of the pulses are not sufficiently constant and that they are practically not capable of being acted upon. In order that this drawback may be lessened, the impulse rhythm is subject to a check-up or control action by a low frequency generator. The keying power which is then required is low, but the above mentioned drawback still exists, though to a lesser degree.

Now, according to this invention the impulses are produced by producing upon the oscillator tube a positive control action at the impulse rhythm to change it from the oscillatory to the non-oscillatory state. In other words, unlike the so called "trickle" method, the tube will then no longer operate more or less accurately, but will stop entirely whenever the keying mechanism should happen to fail. The incidental fact that the tube no longer is called upon to fulfill a double purpose, i. e., to operate as an impulser and as an oscillator, and that rather two generators are utilized therefor, assures stability of operation. The power of the impulse transmitter used in this scheme is as low as may be compatible with reliable operation.

The oscillation state of the high frequency generator tube may be controlled and regulated in various ways. For instance, by the agency of a controlled non-linear resistance, say, a rectifier depending for its action upon a biasing voltage, either the damping or the feedback may be so altered that the oscillations will be initiated or stopped at the rhythm of the variations of the biasing voltage. Recourse could be had also to tubes equipped with a plurality of grids, the initiation and discontinuance of the oscillations being then regulated, for example, by variation of the screen grid potential.

Figure 4:
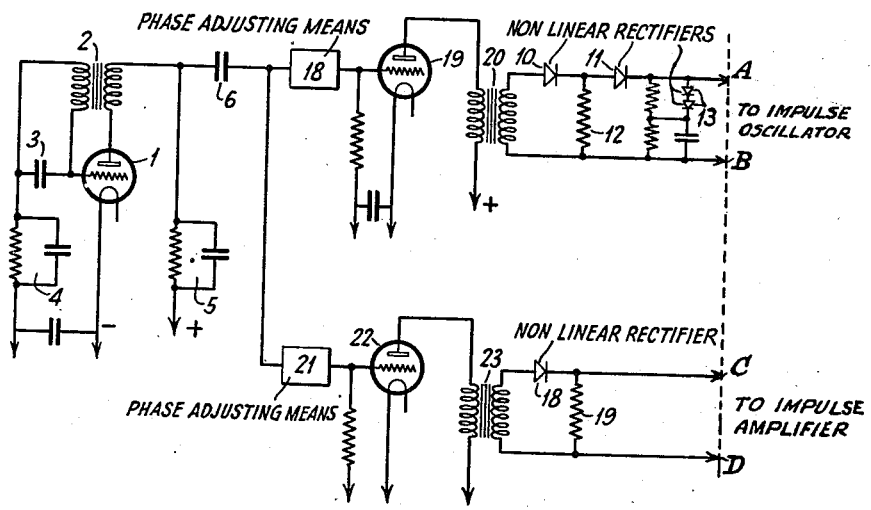
Figure 6:
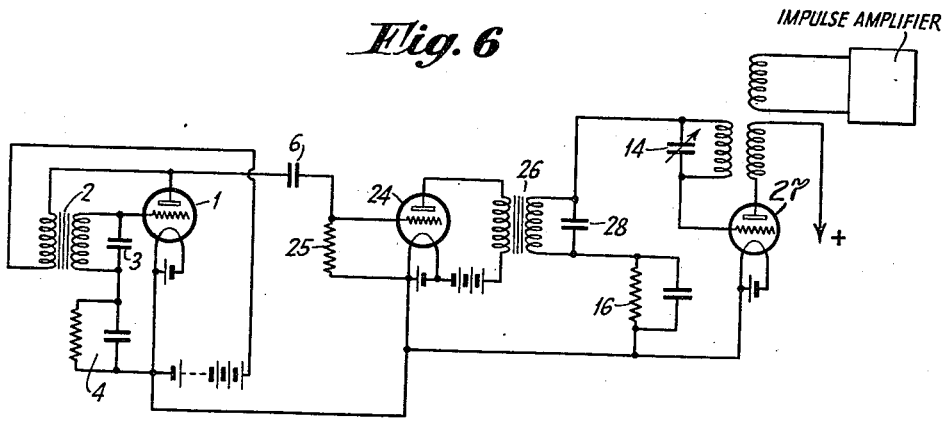

In describing my invention in detail reference will be made to the attached drawings wherein:

Figure 1 illustrates a high frequency generator, a source of alternating current of substantially sine wave form, and amplifying and wave forming circuits connecting said source of alternating current to an electrode in said generator;

Figures 2a to 2d inclusive are curves showing the manner in which the alternating current energy of substantially sine wave form is modified before being applied to the generator for control purposes;

Figures 3, 4, and 6 illustrate modifications of the arrangement of Figure 1. In Figures 3, 4, and 6 the alternating current of substantially sine wave form is also used to control an amplifier connected with the output of the control generator; while Figures 5a, 5b, 5c, and 5d are curves illustrating the manner in which the alternating current of substantially sine wave form is modified as to form by the coupling circuits of Figure 6.

Figure 2A:
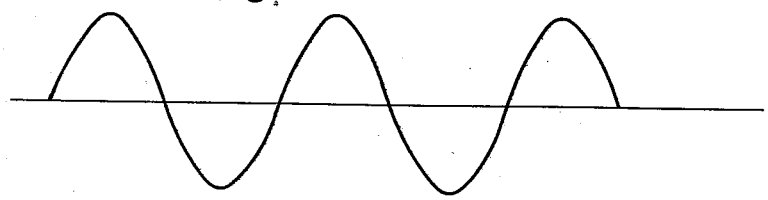
Figure 2B:
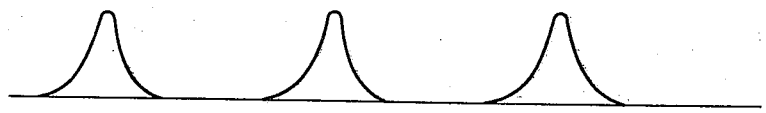
Figure 2C:
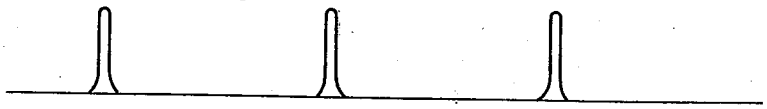
Figure 2D:
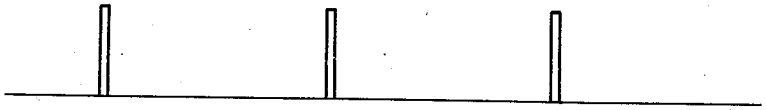

To exemplify the basic idea of this invention, the scheme of control of oscillation (or oscillatory state) shall be described in what follows in more detail in connection with regulation of control grid bias voltage of a triode tube (Figure 1). The audio frequency tonal generator consists of a tube 1. The latter is tuned to the frequency of the keying rhythm, say, 300 cycles per second, by the aid of the feedback or tickler transformer 2 and condenser 3. Whenever more than one keying frequency is to be used, the said condenser and coil could be made variable as known in the art. A resistance condenser combination 4 included in the grid circuit serves to maintain an adequate grid biasing voltage and to insure greater stability by limiting the grid current. If desired, a similar combination 5 could be included in the plate circuit. The audio frequency note will then be put, by way of the large coupling condenser 6, upon the grid of the amplifier tube 8 which, by the aid of the grid battery 7 is impressed with such a marked negative biasing voltage that it will properly amplify only unilateral peaks of the impressed potential. In fact, it turns the sinuous note shown in Figure 2a into a sequence of comparatively brief amplifier impulses shown in Figure 2b, and these impulses are made available across the terminals of resistance 9. They are fed by way of a large coupling condenser to a non-linear voltage divider comprising a rectifier 10 having a non-linear characteristic, and a linear resistance 12. It is only in the presence of a sufficiently high voltage that the rectifier 10 will become adequately conducting so that across 12 approximately the same fall of voltage will happen as across 9. As a result, the impulses shown in Figure 2b are further changed so as to assume, say, the shape shown in Figure 2c. This procedure could be continued by the aid of the voltage dividers indicated at 11 and 13. In such a scheme 13 could be designed as shown by way of example so that the peaks of the impulses of Figure 2c are suppressed and that impulses of the kind illustrated in Figure 2d result. It will be understood that it is by no means necessary to resort to all of these impulse formations, in fact, in most instances, one or two of them will insure a satisfactory form of impulse. Moreover, condenser 6 could be connected at some other suitable point. For instance, in many cases connection with the grid of tube 1 will be suitable. The impulses obtained across 13 will then control the normally non-oscillable high frequency generator 15 so that it will be caused to get into the state and range of oscillations. In the circuit organization illustrated in Figure 1, the said generator is shown to produce itself the blocking potential by the resistance condenser combination 16, for instance, by the aid of a trickle frequency so low that no disturbing action is produced. However, the requisite negative grid biasing voltage may be applied to the grid also in some other manner. The high frequency impulses produced in a way as just described are thereupon amplified and transmitted in the usual manner.

If standard dimensions are used it is then found that the power or end tubes, in quiescent state, must be biased by about the same extent as in telephonic operation, lest the power tubes become overloaded. Thus, according to another object of this invention, in equipment of the kind as just disclosed the power or end tubes, in quiescent state, are so biased that they will not be fully loaded by the direct current discharge, and that the impulse generator, during impulsing periods, will not only cause the oscillator tube to assume the oscillation state, but will also cause the biasing potential of the power tube or tubes during the impulse periods to be so altered that the same will be able to deliver several times the normal average telephone power and even several times the normal maximum telegraphic power. For this purpose, the voltage impressed on the combination 13, Figure 1, is impressed also upon the grid of the power tube. As a general rule, however, the power tube is in need of a substantially higher impulse control energy than the oscillator tube. As a general rule, it will therefore be recommendable to choose such dimensions for the circuit organization that the major power is fed to the power or end stage.

This is feasible, for instance, in the circuits organization Figure 3, where the plate circuit scheme of tube 8 of Figure 1 is used with a number of modifications. In lieu of the resistance arrangement, a transformer 17 is employed in Figure 3, the said transformer being provided with two secondary windings. One of these latter is loaded with a distorting means comprising elements 10—13 which is essentially the same as in Figure 1. The second secondary winding which as a general rule contains an essentially greater number of turns is connected with a similar distorting arrangement which will feed the stronger impulses by way of a non-linear rectifier 18 to the resistance 19 across which a supplemental biasing voltage is collected for the grids of the power tube or tubes 20. Of course, the scheme hereinbefore outlined does not constitute the only embodiment of the second object of this invention which as a general rule, consists in causing simultaneously with the shift of the operating point of the oscillator tube a similar shift in the end or power tube. It will be understood that at the same time also non-linear resistances in the power tube circuit could be varied with a view to varying the feedback or other circuit conditions.

Various ways and means adapted to change the shape of the impulses in a definite manner have been outlined above. In addition, it becomes quite often necessary to make the duration of the impulses regulable, say, between 0.1 and 1 milli-second. This could be accomplished by ways and means similar to those used for causing deformations or changes in form by a variation of the biasing voltage 7 in Figure 1 and the introduction of such additional biasing voltages as may be required in the distortion rectifiers 10, 11 and 18, Figures 1 and 3. Instead of causing changes in the rectifier characteristics by variations of the biasing voltage, the same end may be attained by a change of connections of the rectifiers.

According to a further object of this invention, regulation of the duration of the impulses may also be effected in such a way that the impulses will arise in the oscillator tube and in the power tube at slightly different instants, with the result that a signal will be sent out only during such instants when the two impulses happen to overlap, or that the impulse will be sent out with full power only during a length of time which is regulable by the aid of time shift. For instance, the two secondary windings of transformer 17, Figure 3, may be associated with phase shift circuit means known from the earlier art so designed that the two impulses will reach the two grids of the controlled tubes with a time difference corresponding to an adjustable phase difference. But this simple method does not insure full utilization of the chances to cause distortion offered by tube 8 seeing that the fundamentals and overtones are not displaced the same time difference. Therefore, according to this invention the particular impulse which is to arrive later is passed through a choke (low-pass) filter since such a filter has the property of retarding all alternating currents inside its range of transmission an amount of time equal to $$T = \frac{n}{\pi f_0}$$

where $n$ = number of units or meshes, and $f_0$ upper frequency limit of transmission range. This network 40 is preferably not connected with the end of the distortion means since it will also cause minor unintended compensating distortions. Referring to Figure 3, it is preferably connected between 8 and the rectifier 10 and the resistance 12. A limiting upper cut off frequency of from 1000 to 2000 cycles will then suffice, and all retarding times demanded in practice will be obtainable with comparatively short networks, say, comprising three meshes.

As a general rule, it will be recommendable to retard the impulse fed to the oscillator tube seeing that even when the power tube is blocked a little amount of energy will always reach the aerial when the oscillator is oscillating. In other words, if the power tube were to be delayed then the initiation of the impulsing would be indistinct or blurred, while, in the reverse case, the decaying impulse would be somewhat blurred.

If in any special case the discontinuing or decaying impulse were to be used for observation, then retardation of the power tube impulse would be recommendable.

Whenever the requisite impulse control powers are essentially different a circuit organization as shown in Figure 4 may be particularly suited. Separation of control potentials for the oscillator tube and the power tube is effected in this circuit organization at the coupling condenser 6, and amplification for both stages is separate. The circuit elements 18 and 21 represent arrangements designed for causing phase shift of sinuous potentials known in the prior art, one thereof being capable of producing, say, a regulable angle of phase lead and the other one a regulable angle of lag. One of the said two circuit elements 18 and 21 could also be dispensed with, most particularly when the used circuit organization allows of a phase shift of 360 degrees. One advantage residing in this scheme is that the phase angles of sinuous potentials are altered and that only limited circuit means are required therefor. The means adapted to affect the curve shape are the same and are applicable to the same extent as in connection with the circuit organization shown in Figure 3. The circuit in Figure 4 is a modification of the portion of Figure 3 to the left of the dotted line. Reference letters A, B, C, D, indicate the points of connection to the oscillator and amplifier of Figure 3.

Another very simple and reliable method of transmitting impulses according to the present invention is predicated on the use of an undermatched modulation transformer in conjunction with an overloaded amplifier tube (Figure 6) which shall be described more fully in what follows. The low frequency generator comprises the tube 1, the feedback or tickler transformer 2 and the condenser 3 and the resistance and condenser network or mesh 4, and works by way of a large coupling condenser 6 upon a high resistance 25, the latter being connected in parallel relation to the grid cathode path of the amplifier tube 24. By virtue of the high resistance 25 the plate current-grid voltage characteristic of tube 24, at incipient grid current, shows a saturation value for the plate current when the grid potential is measured not directly at the grid, but rather between the grid and the filament with interposition of resistance 25. As a result the sinuous voltages (Figure 5a) which are fed from the low frequency generator 1 will be unilaterally distorted trapezoidally upon the incipiency of the grid current flow with the consequence that the plate current of tube 24 is caused to assume a form as shown in Figure 5b. Transformer 26 will thus be under-matched, in other words, its primary impedance $w_0L_p$ satisfies the condition $w_0L_p < R_{i24}$ where $R_{i24}$ is the internal impedance of tube 24. Then the secondary potential of transformer 26 will be equal to the next stage of the current curve, Figure 5b, i. e., equal to 5c. If $w_0$ is the frequency (in radians) or cyclic frequency of the low frequency generator, and if the condition is laid down that the breadth of the peaks at a point one-third up should equal only one-tenth the period, then $$\frac{2L_p}{R_{i24}} = \frac{2\pi}{10 w_0}$$

in other words $$L_p = \frac{\pi}{10 . w_0} \cdot R_{i24}$$

It has been assumed in this connection that the grid of the oscillator tube 27 of the transmitter does not constitute any load for the low frequency part. As a matter of fact, this condition will be fulfilled as long as the transmitter does not oscillate. But when the voltage peaks of curve 5c are sufficiently high to cause the transmitter to change from the non-oscillatory state to the oscillatory state, the grid current will suddenly start to flow, and the grid current curve will have a form as shown in Figure 5d, and this represents at the same time the envelope of the transmitted radio frequency impulses. The condenser 28 (Figure 6) is small and serves merely to allow the high frequency to leak away from the secondary end of transformer 26.

Actual tests have demonstrated that the building-up of the oscillations proceeds so much faster, the harder, that is to say, the briefer and the more powerful, the build-up shock of the impulse manifests itself in the plate current. Under these conditions, the tube will not only be shocked from the non-oscillable into the proper oscillatory state, but it receives at the same time a powerful impact which will cause a so much more powerful excitation of the oscillations, the briefer it happens to be. What is thus obtained is a substantial abbreviation or even the total suppression of the building up process. The front or face of the shock should preferably be made so steep that a substantial portion of the total rise, say, one-tenth to around one-half, will occur inside a length of time equal to $1/f$ seconds, where $f$ is the frequency of the ensuing oscillation. There is no sense in extending the rise, for, as provable by experiments, the excitation will not be intensified as a consequence. Maximum excitation is securable if the total rise happens approximately inside a period of time equal to $1/2f$ seconds but the growth in excitation energy does not rise in direct proportion to the abbreviation of the time. Hence, the values above indicated will practically be sufficient to cause an instantaneous initiation of the oscillations. Transmitting on ⅓ megacycle, then $1/f$ would be equal to $3 \times 10^{-6}$, in other words, about 1% of the usual impulse time of $3 \times 10^{-4}$ sec. Inside this length of time, a substantial portion of the incipient shock must have elapsed.

This is accomplishable, for instance, by that a low frequency tone of, say, 300 cycles is distorted into an approximately rectangular curve-shape of the desired impulse duration. Curves of the said sort are obtained by the aid of saturated tubes, say, with tungsten cathode or tubes operating on high grid series resistances which exhibit saturation phenomena with incipient grid current flow. Also screen grid tubes are suited for the same purpose.

We claim:
1. In an impulse generating system the combi- nation of, a wave generator which is normally inoperative, a source of wave energy of substantially sine wave form, a circuit including wave form distorting means coupling said source to said generator to recurrently render said generator operative at the rhythm of said generating wave energy, an amplifier coupled to said generator to amplify the impulse produced thereby, and a circuit including wave form distorting means coupling said amplifier to said source to recurrently control the gain of said amplifier at the rhythm of said wave energy.

2. A system as recited in claim 1 in which one of said circuits includes phase changing means.

3. In a signalling system, an electron discharge device having a plurality of electrodes coupled in regenerative circuits, means for impressing potentials on said electrodes such that oscillations are produced in said device and circuits, means in a direct current circuit between two of said electrodes for producing a potential drop due to said produced oscillations to bias said device to substantially cut off, a source of intermittent impulses or waves of square wave form of controllable duration, means for impressing said impulses on an electrode of said oscillation generator to intermittently unblock the same, an amplifier having an input coupled with said device, and means controlled by said impulses for controlling the gain of said amplifier.

4. In an impulse producing system, an oscillation generator of the electron discharge tube type with means normally biasing said tube to cut off, a source of wave energy of substantially sine wave form, a wave distorting circuit coupling said last named source to said aforesaid means to recurrently overcome said cut-off bias and render said generator operative, an amplifier tube with means normally biasing the same to pass current coupled with said generator, and means coupling said distorting circuit to said last named means to bias said amplifier to pass more current when said cut-off bias on said generator tube is overcome.

5. In means for producing and amplifying wave energy impulses of short duration, the inceptions of which are separated by substantially equal time intervals, a source of alternating current energy of substantially sine wave form, means for distorting said energy of said sine wave form to produce thereby recurring impulses of substantially square topped form, the inceptions of which are separated by substantially equal time intervals, a high frequency wave energy generator which is normally inoperative, means for impressing said produced substantially square topped impulses on said generator to render the same operative for recurring short periods, a wave amplifier coupled with said generator, said wave amplifier being normally of small gain, a second means for distorting said wave energy of sine wave form to produce additional somewhat square wave topped impulses, and means for impressing said last produced impulses on said amplifier to recurrently increase the gain thereof.

6. A system as recited in claim 5 wherein wave retarding means is interposed between said source of wave energy of substantially sign wave form and one of said distorting means.

7. In a system for producing, amplifying, and transmitting energy impulses, the inceptions of which are spaced as to time by substantially equal time intervals, a source of alternating current energy, a high frequency generator of the electron discharge tube type having a plurality of electrodes including a control electrode connected in oscillation producing circuits, means in a direct current circuit between two of said electrodes for producing a potential drop due to current flow therein sufficient to normally bias said tube to cut off so that no oscillations are produced, an amplifier tube having input electrodes coupled to said oscillation producing circuits, means for biasing an electrode of said amplifier tube to a potential such that the gain thereof is normally small, wave form distorting means comprising rectifiers and impedances coupling said source of alternating current to said direct current circuit between two of the electrodes of said first electron discharge tube, and wave form distorting means including a rectifier coupling said source of alternating current energy to the input electrodes of said amplifier to recurrently increase the gain thereof at the rhythm of said alternating current energy.

8. A system as recited in claim 7 wherein wave retarding means is included in said wave form distorting circuit coupled between said alternating current source and said direct current circuit.

PAUL KOTOWSKI.
SIEGMUND SONNENFELD.